June 21, 1966     J. E. ADAIR     3,256,627
ORNAMENTED DRINKING GLASS
Filed Nov. 18, 1964
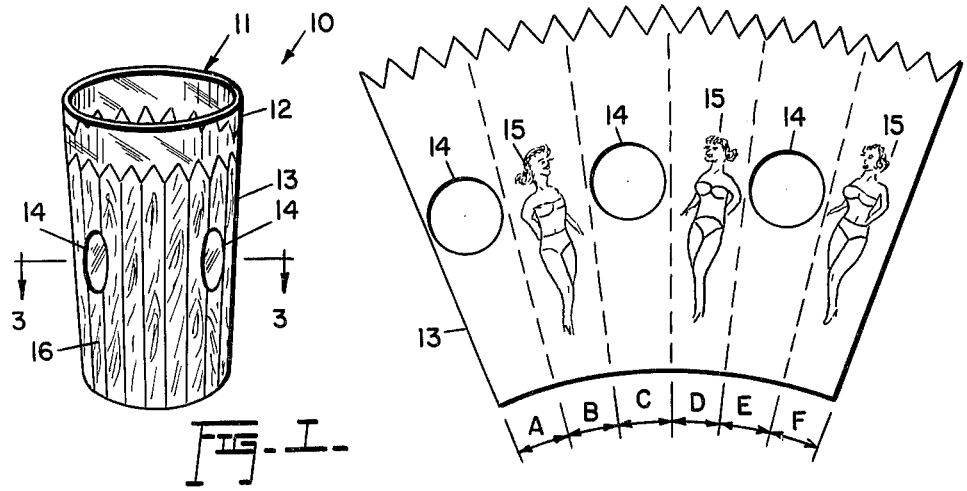
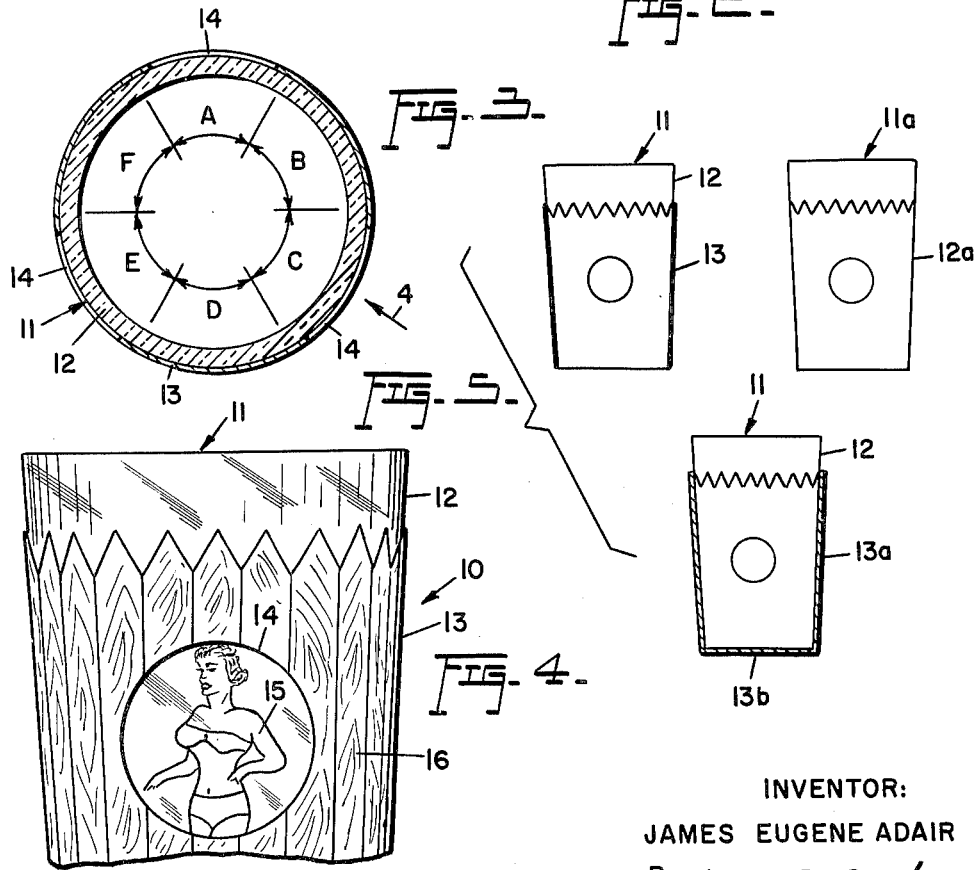
INVENTOR:
JAMES EUGENE ADAIR
By: *Jerry B. Cesak*

United States Patent Office 3,256,627
Patented June 21, 1966

3,256,627
ORNAMENTED DRINKING GLASS
James Eugene Adair, Chicago, Ill., assignor to H. Fishlove & Co., Chicago, Ill., a corporation of Illinois
Filed Nov. 18, 1964, Ser. No. 412,182
3 Claims. (Cl. 40—106.51)

This invention relates to new and useful improvements in the art of ornamental displays, and in particular the invention concerns itself with an ornamented liquid container such as a drinking glass.

The principal object of the invention is to provide an aesthetic, entertaining or amusing novelty item in the form of an ornamented drinking glass such as is commonly used for mixed drinks, beer, highballs, or the like, the glass having an opaque side wall but being provided with one or more transparent portions or peep holes, and also having ornamentation on regions thereof opposite the peep holes, such ornamentation being visible through the peep holes, transversely of the glass and through liquid such as the glass may contain. Such liquid produces effects of magnification and distortion, especially when transparent solids such as ice cubes are immersed therein, so that the ornamentation as viewed through the peep holes has an enlarged and/or animated appearance.

Along with the foregoing, the invention also provides surface ornamentation on the outside of the glass side wall around the peep holes, which is environmentally coordinated with that visible through the peep holes, so that the overall novelty effect of the invention is even more enhanced.

In its simple form, the invention may be embodied in a drinking glass made of opaque material but provided in its side wall with one or more transparent portions through which may be viewed ornamentation on inner surface regions of the side wall opposite to such transparent portions. In a more elaborate embodiment, the drinking glass may have a transparent side wall, to the outer surface of which is permanently applied a layer of opaque material as for example, a decalcomania, such a material layer having one or more sight openings or peep holes and ornamentation on its inner surface regions opposite the peep holes. As another possibility, the ornamentation and peep holes may be embodied in a covering jacket, removably applied to any conventional drinking glass. Further still, such a jacket may be made of moisture-absorbent material, so that apart from its ornamental aspects it may also serve as a condensation collector. Still further, the ornamental jacket may be made of rigid material such as metal or plastic, so as to additionally serve as a holder for the drinking glass itself.

Other advantages of the invention reside in its simplicity of construction, in its aesthetic and entertaining value, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a perspective view showing one embodiment of an ornamented drinking glass in accordance with the invention;

FIGURE 2 is a developed plan view showing the inner surface of the ornamental layer;

FIGURE 3 is an enlarged cross-sectional view, taken substantially in the plane of the line 3—3 in FIGURE 1 and exaggerated as to thickness of the ornamental layer for purposes of clarity of illustration;

FIGURE 4 is an enlarged, fragmentary side elevational view, taken substantially in the direction of the arrow 4 in FIGURE 3; and FIGURE 5 is a group diagramatic view showing different embodiments.

Referring now to the accompanying drawings in detail, the ornamented drinking glass of the invention is designated generally by the reference numeral 10. In the embodiment of FIGS. 1–4, the same comprises a conventional drinking glass 11 having the usual transparent side wall 12, to the outer surface of which is permanently applied a film-like material layer 13, so that the side wall 12 is completely surrounded thereby. The material layer 13 may be in the form of a decalcomania adhesively held to the side wall, or a ceramic decalcomania fused into the glass side wall during firing.

In any event, the material layer 13 is opaque but is provided at circumferentially spaced points with a plurality of sight openings 14, these providing transparent portions or peep holes at the sides of the glass, through which the inner surface of the material layer 13 may be viewed transversely of the glass and of any liquid such as may be contained therein.

Regions of the inner surface of the material layer 13 which are opposite the respective peep holes 14 are provided with surface ornamentation 15, such ornamentation being visible through the peep holes transversely of the glass, as will be readily understood. For illustrative purposes the circumferential span of the material layer 13 has been shown as divided into six segments A, B, C, D, E, F, the alternate segments A, C, E being provided with the peep holes 14 and the alternate segments B, D, F carrying the ornamentation 15, so that, for example, the ornamentation on the segment F is visible through the peep hole in the segment C. However, more or less than three peep holes may be provided with a corresponding increase or reduction in the number of segments, as for example, only two segments may exist, with a peep hole in one and ornamentation on the other.

A highly entertaining novelty effect may be derived from viewing the ornamentation through the peep holes, especially when the glass contains a transparent liquid which magnifies and/or distorts vision so that the ornamentation appears enlarged or even animated. This effect is further increased when the liquid in the glass contains transparent solids, as for example, ice cubes. To further enhance the novelty effect, the outer surface of the material layer 13 is preferably provided with additional ornamentation 16 which, for illustrative purposes, has been shown as representing a wooden fence with knot holes represented by the peep holes 14; so that the outside ornamentation 16 is environmentally coordinated with the ornamentation 15 on the inside of the layer 13.

In the diagrammatic illustration of FIG. 5 the film-like, relatively thin material layer 13 has been shown as applied to the side wall 12 of the glass 11 as already described in connection with FIGS. 1–4, such a material layer, for example, comprising a decalcomania adhesively or ceramically bonded to the glass. However, as a modification, a special drinking glass 11a may be made of opaque rather than transparent material, and the side wall 12a of the opaque glass may have transparent portions to serve as peep holes for viewing ornamentation provided directly on the inner surface of the glass opposite the peep holes. As another modification, the material layer as indicated at 13a may be relatively thick rather than film-like, and may be applied to the conventional glass 11 in the nature of a cover or jacket. In such an instance the jacket 13a may be removable from the glass or purposes of washing the latter and, conveniently, the jacket 13a may be formed from heavy paper or light cardboard, with the surface ornamentation suitably printed thereon. Further still, the jacket 13a may be made of moisture-absorbent material and may include a bottom portion 13b to underlie the bottom of the glass, so that apart from its ornamental aspects, the device may also serve as a condensation collector. Finally, the jacket 13a with or without the bottom 13b may be made of rigid material such as metal or plastic, so as to serve as a holder for the glass itself.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. The combination of a drinking glass having a bottom and a transparent side wall, a shape-conforming ornamental jacket of moisture-absorbent material removably applied to said drinking glass, said jacket including a bottom underlying the bottom of the glass and a side wall surrounding the side wall of the glass, the side wall of said jacket being opaque but provided with at least one sight opening whereby the inner surface region of the jacket side wall opposite said opening may be viewed transversely of the drinking glass, ornamentation representing a human figure provided on said inner surface region of the jacket side wall opposite said opening for viewing through the opening, viewing said representation of the human figure through said opening producing an illusion of animation when the glass is filled with a liquid, and additional ornamentation provided on the outer surface of the jacket side wall around said opening to represent a wooden fence, said opening apparently corresponding to a knot hole in the represented wooden fence.

2. The combination of a drinking glass having a bottom and a transparent side wall, a film-like material layer bonded to said side wall and surrounding the same, said material layer being opaque but provided with at least one sight opening whereby the inner surface region of said layer opposite said opening may be viewed transversely of the drinking glass, ornamentation representing a human figure provided on said inner surface region of said layer opposite said opening for viewing through the opening, viewing said representation of the human figure through said opening producing an illusion of animation when the drinking glass is filled with a liquid, and additional ornamentation provided on the outer surface of said material layer around said opening to represent a wooden fence, said opening apparently corresponding to a knot hole in the represented wooden fence.

3. The combination of a drinking glass having a bottom and an opaque side wall, said side wall being provided with at least one transparent portion constituting a sight opening through which the inner surface of said side wall opposite said opening may be viewed transversely of the drinking glass, ornamentation representing a human figure provided on the inner surface of said side wall opposite said opening for viewing through the opening, viewing said representation of the human figure through said opening producing an illusion of animation when the drinking glass is filled with a liquid, and additional ornamentation provided on the outer surface of said side wall around said opening to represent a wooden fence, said opening apparently corresponding to a knot hole in the represented wooden fence.

References Cited by the Examiner

UNITED STATES PATENTS

| 635,098 | 10/1899 | Henckel | 40—310 |
| 1,632,347 | 6/1927 | Pipkin | 215—100.5 |

FOREIGN PATENTS 380,869  9/1932  Great Britain.

JOSEPH R. LECLAIR, *Primary Examiner.*

FRANKLIN T. GARRETT, *Examiner.*

R. PESHOCK, *Assistant Examiner.*